United States Patent
Najjar et al.

(10) Patent No.: US 11,340,154 B2
(45) Date of Patent: May 24, 2022

(54) COMPUTER PROGRAM PRODUCT FOR OPTIMAL SENSOR SELECTION AND FUSION FOR HEAT EXCHANGER FOULING DIAGNOSIS IN AEROSPACE SYSTEMS

(71) Applicant: The University of Connecticut, Storrs, CT (US)

(72) Inventors: Nayeff A. Najjar, Willington, CT (US); Shalabh Gupta, Manchester, CT (US); James Z. Hare, Coventry, CT (US); Gregory R. Leaper, Bloomfield, CT (US); Paul M. D'Orlando, Simsbury, CT (US); Rhonda Walthall, Escondido, CA (US); Krishna Pattipati, Storrs, CT (US)

(73) Assignee: THE UNIVERSITY OF CONNECTICUT, Storrs, CT (US)

( * ) Notice: Subject to any disclaimer, the term of this patent is extended or adjusted under 35 U.S.C. 154(b) by 37 days.

(21) Appl. No.: 17/022,742

(22) Filed: Sep. 16, 2020

(65) Prior Publication Data
US 2020/0408669 A1    Dec. 31, 2020

Related U.S. Application Data

(62) Division of application No. 14/700,769, filed on Apr. 30, 2015, now Pat. No. 10,895,523.

(51) Int. Cl.
*G01N 17/00* (2006.01)
*F28F 27/00* (2006.01)
*B64D 13/06* (2006.01)

(52) U.S. Cl.
CPC ........... *G01N 17/008* (2013.01); *B64D 13/06* (2013.01); *F28F 27/00* (2013.01); *B64D 2013/0618* (2013.01)

(58) Field of Classification Search
CPC ............................. G01N 17/008; F28F 27/00
See application file for complete search history.

(56) References Cited

U.S. PATENT DOCUMENTS

| | | |
|---|---|---|
| 4,419,926 A | 12/1983 | Cronin et al. |
| 4,766,553 A | 8/1988 | Kaya et al. |
| 6,491,254 B1 | 12/2002 | Walkinshaw et al. |
| 7,455,099 B2 | 11/2008 | Osborn et al. |
| 7,827,006 B2 | 11/2010 | Miller |
| 7,871,038 B2 | 1/2011 | Space et al. |
| 9,016,075 B1 | 4/2015 | Johnson |
| 2006/0144162 A1 | 7/2006 | Batzinger et al. |
| 2009/0157584 A1* | 6/2009 | Yang ................... G06K 9/6231 706/46 |
| 2014/0008035 A1 | 1/2014 | Patankar et al. |
| 2015/0314878 A1 | 11/2015 | Lukens et al. |
| 2016/0178285 A1 | 6/2016 | Pal et al. |
| 2016/0214723 A1 | 7/2016 | Fox et al. |
| 2016/0229541 A1 | 8/2016 | Bruno et al. |
| 2016/0229542 A1 | 8/2016 | Bruno et al. |
| 2016/0305865 A1 | 10/2016 | Silva et al. |
| 2016/0306725 A1 | 10/2016 | Hare et al. |

* cited by examiner

Primary Examiner — Michael Jung
(74) Attorney, Agent, or Firm — Cantor Colburn LLP

(57) ABSTRACT

A system and method that determines whether a heat exchanger within a complex networked system is fouling is provided. The system and method includes training classifiers indicative of a plurality of fouling conditions associated with the heat exchanger and testing the classifiers with optimal sensor data from optimal sensors to determine whether the fouling is being experienced by the heat exchanger.

6 Claims, 5 Drawing Sheets

COMPUTER PROGRAM PRODUCT FOR OPTIMAL SENSOR SELECTION AND FUSION FOR HEAT EXCHANGER FOULING DIAGNOSIS IN AEROSPACE SYSTEMS

CROSS-REFERENCE TO RELATED APPLICATIONS

This application is a division of U.S. application Ser. No. 14/700,769 filed Apr. 30, 2015, the disclosure of which is incorporated herein by reference in its entirety.

BACKGROUND OF THE INVENTION

In general, a component of the air management system of an aircraft is a heat exchanger, which ensures proper cooling of the engine bleed air. Typically, aircraft heat exchangers suffer from performance degradation due to a phenomenon called fouling. Fouling occurs when unwanted accumulation of external substances, debris, and/or organisms contaminate a surface of heat exchanger fins. Further, complex environments, such as aerospace systems, operate under varying altitudes levels, ambient temperatures, passenger loads, and other uncertainties that make fouling diagnosis very challenging. Moreover, determining the critical sensors to analyze for fouling diagnosis is difficult due to the interconnections and interdependencies between different components and sensors.

To detect fouling, current methodologies are based on regular physical inspection or observing off-nominal events in sensor data. These events are triggered if sensor data crosses simple thresholds that limit detection to a binary mechanism. These methodologies are also prone to high false alarm rate and missed detections. Furthermore, since the air management system has a large sensor suite, large amount of data are generated that make the analysis computationally complex. Further, the current methodologies do not perform multi-nary classification of fouling severities, do not present the correct classification rate (CCR) and the false alarm rate, do not address the problem of optimal sensor selection and fusion for fouling diagnosis, and are also very susceptible to noise in the data.

BRIEF DESCRIPTION OF THE INVENTION

According to one embodiment, a method of determining whether a heat exchanger is fouling comprises training classifiers indicative of a plurality of fouling conditions associated with the heat exchanger, the heat exchanger being within a complex networked system herein the air management system; and testing the classifiers with optimal sensor data from optimal sensors to determine whether the fouling is being experienced by the heat exchanger.

According to another embodiment, a computer program product comprises a computer readable storage medium having program instructions for determining whether a heat exchanger is fouling embodied therewith. The program instructions are executable by a processor to cause the processor to perform a training of classifiers indicative of a plurality of fouling conditions associated with the heat exchanger, the heat exchanger being within a complex networked system; and a testing of the classifiers with optimal sensor data from optimal sensors to determine whether the fouling is being experienced by the heat exchanger.

Additional features and advantages are realized through the techniques of embodiments herein. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF THE INVENTION

A detailed description of one or more embodiments of the disclosed apparatus and method are presented herein by way of exemplification and not limitation with reference to the Figures.

As indicated above, the current methodologies for detecting fouling provide limited efficiency and accuracy due to the large amount of data and limited analysis capabilities. Thus, what is needed is a mechanism that utilizes algorithms of optimal sensor selection and fouling diagnosis in conjunction with machine learning tools.

In general, embodiments disclosed herein may include a system, method, and/or computer program product (herein diagnosis system) that performs a heat exchanger fouling diagnosis of a complex networked system. Fouling diagnosis is a detection and identification of a fouling level of a blocked or congested heat exchanger, which is unable to cool a medium at an optimal efficiency, within the complex networked system.

The complex networked system (e.g., an environmental control system) is a system that includes heat exchanges, air cycle machines, condensers, water extractors, etc., each of which are connected via tubes, pipes, ducts, valves, and the like, to supply the medium (e.g., gases, liquids, fluidized solids, or slurries) at a particular flow rate, pressure, and/or temperature to an outlet (e.g., to chambers of a vehicle, such as a cabin or flight deck of an aircraft). The heat exchanger fouling diagnosis operates in view of difficulties in managing these components, along with sensors coupled to the complex networked system (e.g., the current methodologies described above have extreme difficulty in isolating a correct sensor to diagnose fouling), and in view of external factors, such ambient noise, temperatures, and conditions, that affect the complex networked system (e.g., flying conditions when the complex networked system is on an aircraft).

Figure 1:
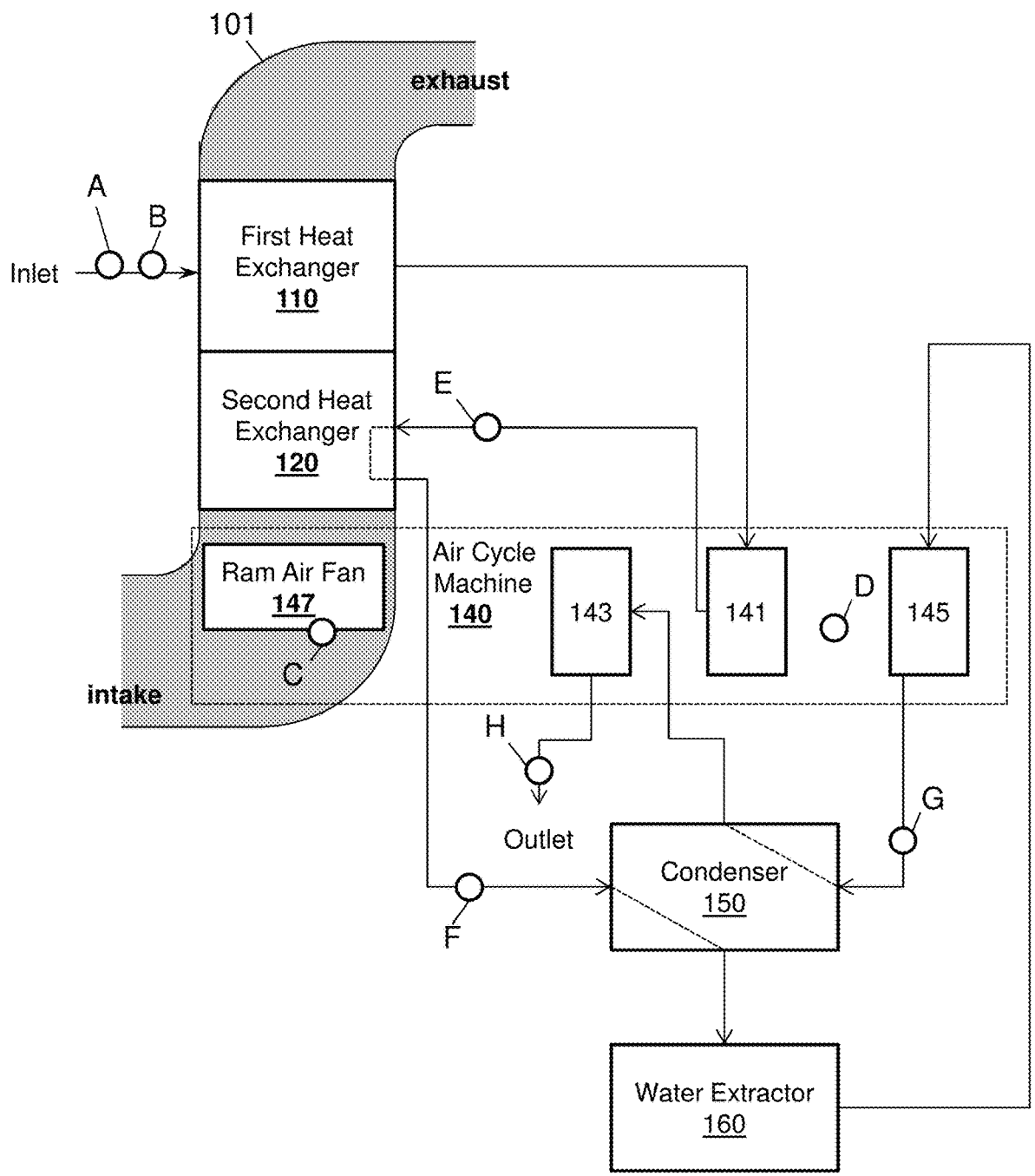
FIG. 1 depicts a schematic of an air management system coupled with an environmental control system in accordance with an embodiment.

Turning now to FIG. 1, the complex networked system will now be described with reference to an air management system 100 of an aircraft. That is, the air management system 100 may be viewed as an embodiment of the complex networked system. The air management system 100 can be an integrated thermal control system that consists of two main parallel sub-systems, each of which can be an environmental control sub-system that provides temperature, humidity, and pressure controlled air to a cabin of the aircraft. For the safety and comfort of occupants, it is critical to ensure that the air management system 100 operates in a healthy condition. Further, in absence of an onboard fault diagnosis tool, the air management system 100 has to be scheduled for periodic maintenance that causes unwanted interruption of the aircraft operation (possibly for several days), and incurs huge financial costs.

A diagnosis system can be coupled to, integrated with, or receive data from the air management system 100. In this way, the diagnosis system provides a reliable heat exchanger fouling diagnosis methodology for the air management system 100 that generates early warnings of fouling and enables cost saving maintenance.

The air management system 100 includes a shell 101, a first heat exchanger 110, a second heat exchanger 120, an air cycle machine 140 (that can include a compressor 141, turbines 143, 145, and a fan 147), a condenser 150, and a water extractor 160, each of which are connected via tubes, pipes, ducts, valves, and the like, such that air is accepted at Inlet from a source at an initial flow rate, pressure, and temperature and provided to Outlet (e.g., cabin, flight deck, etc.) at a final flow rate, pressure, and temperature. The source may be a low-pressure location of an engine of an aircraft, a high-pressure location of the engine of the aircraft; recirculated air from a cabin of the aircraft; or combination thereof. In this way, credentials of the air at the Outlet (e.g., the final flow rate, pressure, and temperature) enable the aircraft to receive pressurized and cooled air from the air management system 100.

The shell 101 is an example of a ram chamber of a ram system that uses dynamic air pressure created by the aircraft in motion to increase a static air pressure inside of the shell.

Heat exchangers (e.g., a first heat exchanger 110 and a second heat exchanger 120) are equipment built for efficient heat transfer from one medium to another. Examples of heat exchangers include double pipe, shell and tube, plate, plate and shell, adiabatic wheel, plate fin, pillow plate, and fluid heat exchangers. In operation, air forced through the shell 101 is blown across the heat exchangers at a variable cooling airflow to control a temperature of the air inside the heat exchanges. For example, the direction through which the inside air flows is called the hot-side, while the direction through which the shell air flows is called the cold-side of the heat exchanger. With respect to fouling, debris accumulates on the heat exchangers due to several factors, including chemical reactions, corrosion, biological multiplications, and freezing, and obstructs the shell air flow. In view of a configuration of the heat exchangers 110, 120 of the air management system 100, fouling generally occurs on an intake side of the shell 101 of the second heat exchanger 120.

The air cycle machine 140 is a mechanical device that regulates a pressure of a medium (e.g., increasing a pressure of the air). Examples of a compressor include centrifugal, diagonal or mixed-flow, axial-flow, reciprocating, ionic liquid piston, rotary screw, rotary vane, scroll, diaphragm and air bubble compressors.

The compressor 141 is a mechanical device that regulates a pressure of the bleed air received from the first heat exchanger 110. The turbines 143, 145 are mechanical devices that drive the air cycle machine 140. The fan 147 is a mechanical device that assists in manipulating air through the shell 110 (e.g., via push or pull methods) for a variable cooling airflow across the heat exchangers 110, 120. The compressor 141, the turbines 143, 145, and the fan 147 together illustrate, for example, that the air cycle machine 140 may operate as a four-wheel air cycle machine. Note that while FIG. 1 illustrates an example orientation of the air cycle machine 140 and its components with respect to the shell 101, the first heat exchanger 110, and the second heat exchanger 120, other orientations may be utilized.

The condenser 150, which are typically heat exchangers as described above, is a device or unit used to condense the air from a gaseous state to a liquid state, typically by cooling the air such that latent heat is given up by the air and transferred to a condenser coolant. The water extractor 160 is a mechanical device that performs a process of taking water from any source, such as air, either temporarily or permanently.

Valves, while not shown in FIG. 1, are devices that regulate, direct, and/or control a flow of the air by opening, closing, or partially obstructing various passageways (e.g., tubes, pipes, . . . etc) of the air management system 100. Valves may be operated by actuators such that flow rates of the air in any portion of the air management system 100 may be regulated to a desired value. For example, a valve at the intake of the shell 110 enables the intake of ambient air external to the aircraft into the shell 101, such that the ambient air may pass through the first and second heat exchangers 110, 120 and cool the air before exiting as an exhaust (e.g., the method of intake may be a pull method by a fan 147 of the air cycle machine 140 or a ram method).

In addition, the air management system 100 includes a plurality of sensors, as represented by sensors A-H. In general, a sensor is any device that detects events or changes in quantities and provides a corresponding output, e.g., as an electrical or optical signal. Examples of quantities that a sensor can detect include but are not limited to light, motion, temperature, magnetic fields, gravity, humidity, moisture, vibration, pressure, electrical fields, sound, and other physical aspects of an external environment. With respect to the air management system 100, the plurality of sensors detects status information of different components and provides that information to the diagnosis system (e.g., a processing device 500 as further described below with respect to FIG. 5). The plurality of sensors can be one of four types of sensors: a flow sensor, a temperature sensor, pressure sensor and a speed sensor. The flow sensors measure the flow rate of the air entering or exiting a component of the air management system 100. The temperature sensors measure the temperature of the air at that sensor location. The pressure sensor measures the pressure of the air at that sensor location. The speed sensors measure the revolutions per minute of a component of the air management system 100.

For example, a first sensor is an inlet pressure sensor A; a second sensor is an inlet mass flow sensor B; a third sensor is a ram air fan speed sensor C; a fourth sensor is an air cycle machine speed sensor D; a fifth sensor is a compressor outlet temperature sensor E; a sixth sensor is a second heat exchanger outlet temperature sensor; a seventh sensor is condenser inlet temperature sensor G; and an eighth sensor is an environmental control system outlet temperature sensor H. Further, since these sensors A-H are also used to control the components of the air management system 100 to produce the desired temperature, humidity, and pressure at the Outlet, accurate measurements are needed for the comfort of the passengers onboard the aircraft.

Figure 2:
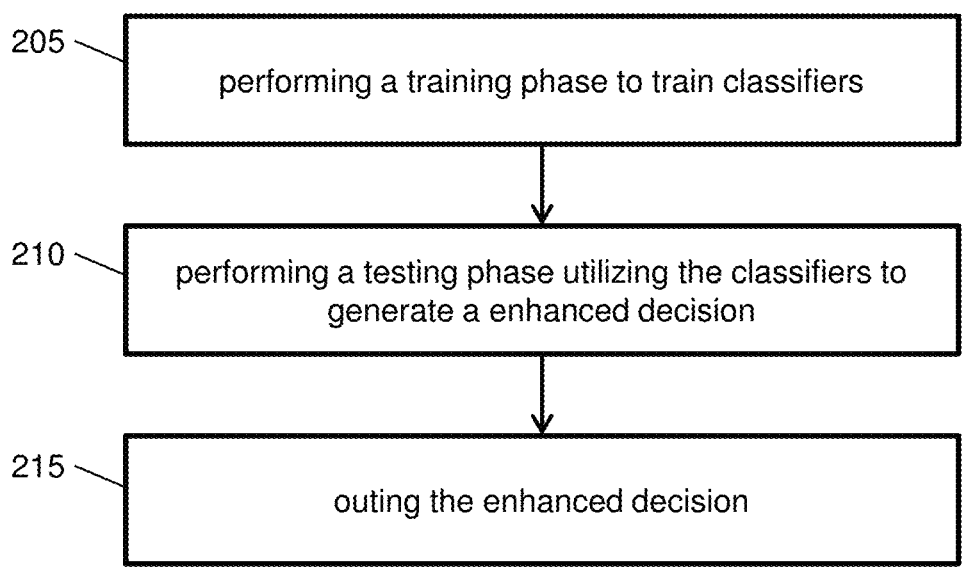
FIG. 2 illustrates a process flow of a diagnosis system in accordance with an embodiment.

In view of the air management system 100, the diagnosis system will now be described with respect to FIGS. 2-5 and with respect to the detection of a fouling condition within the second heat exchanger 120 (e.g., the heat exchanger fouling diagnosis of the complex networked system). Turning now to FIG. 2, a process flow 200 to perform a fouling diagnosis of the second heat exchanger 120 via training and testing phases is depicted. Note that the diagnosis system can utilize a simulation model to simulate the complex networked system (e.g., the air management system 100) in both the testing phase and the training phase.

The process flow 200 begins at block 205, where the diagnosis system performs a training phase to train classifiers indicative of various fouling conditions. In general, the diagnosis system changes different parameters (e.g., parametric combinations), including ambient temperature, ambient noise, occupancy count of the aircraft, etc., within the air management system 100, along with different fouling conditions of the second heat exchanger 120 by modifying a flow impedance, to generate sensor data corresponding to the plurality of sensors. Further, an optimal sensor selection is made from the plurality of sensors of the air management system 100 and utilized to procure optimal sensor data from the sensor data. Features, extracted from the optimal sensor data, are then applied to a set of classifiers that determine a severity of the different fouling conditions. The diagnosis system utilizes a measure of correlations between the severity of the different fouling conditions and the set of classifiers to identify which classifiers are trained to indicate which fouling condition (e.g., the classifiers have been trained to detect types of fouling of the heat exchanger).

Next, the process flow 200 proceeds to block 210, where the diagnosis performs a testing phase utilizing the trained classifiers to determine whether a fouling is present within the air management system 100. For instance, a fouling condition is received by the diagnosis system, along with parametric combinations, to derive a set of unlabeled sensor data. Then, the optimal sensors selected during the training phase are utilized to assist in extracting optimal sensor data from the set of unlabeled sensor data. Features, extracted from this optimal sensor data, are then applied to the trained classifiers that determine an enhanced decision. The enhanced decision is an indication as to whether the fouling condition received by the diagnosis system is in fact present in the air management system 100.

Then, the process flow proceeds to block 210, where the diagnosis system outputs the enhanced decision with respect to the testing phase of block 210.

Figure 3:
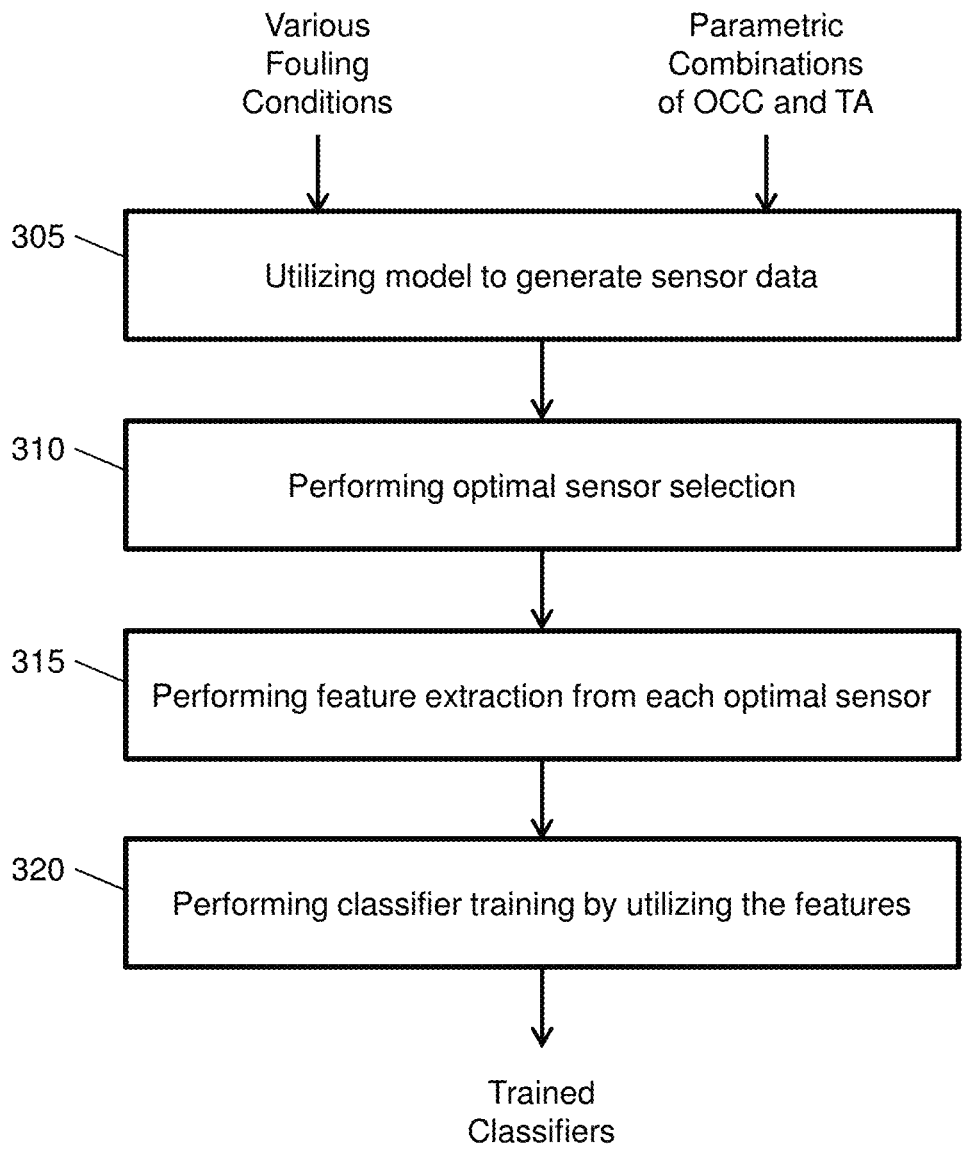
FIG. 3 illustrates a training phase process flow of a diagnosis system in accordance with an embodiment.

Examples of the training and testing phases will now be described with respect to FIGS. 3-4. FIG. 3 illustrates a process flow 300 performed by the diagnosis system. In general, process flow 300 begins, at block 305, with the diagnosis system generating data for each sensor (e.g., sensors A-H) in the air management system 100. For instance, the diagnosis system can utilize the simulation model to generate a time series of sensor data for on ground conditions before the aircraft takes off. This is done because debris usually gets kicked up into the shell 101 due to wind on the ground and due to the fan 147 pulling air through the heat exchangers 110, 120. In an embodiment, the sensor data depends on the parameters of ambient temperature, occupant count, and heat exchanger fouling; however, the sensor data is not limited to these parameters and may include different and/or alternative parameters.

Ambient temperature (TA) is a critical external input parameter that affects sensor readings. In turn, the sensor readings vary significantly with the ambient temperature, such that ambient temperature could lead to false diagnosis of heat exchanger fouling. In this embodiment, to incorporate the effect of the ambient temperature, sensor data is categorized into five different day types: i) extremely cold, ii) cold, iii) medium, iv) hot, and v) extremely hot day types. The temperature ranges for each day type are shown in Table 1. Each day type may further be partitioned into eight uniformly spaced temperature values.

TABLE 1

DAY TYPES

| Day Type | TA (degrees F.) |
| --- | --- |
| Extremely Cold | −30-0 |
| Cold | 0-30 |
| Medium | 30-60 |
| Hot | 60-90 |
| Extremely Hot | 90-100 |

Occupant Count (OCC) also affects sensor readings of the air management system 100 because passengers and crew members produce heat loads in the cabin that affects a desired value of the cabin air temperature and pressure. In this embodiment, a number of occupants is grouped into four categories: i) Low Load, ii) Medium Load, iii) Heavy Load, and iv) Very Heavy Load based on the percentage of occupancy in the cabin. The four categories of load types are shown in Table 2. Since occupant count has relatively less influence on the sensor readings, only the middle point of each category is used for data generation.

TABLE 2

PASSENGER LOAD CATEGORIES

| Load Type | OCC |
| --- | --- |
| Low Load | 0%-60% |
| Medium Load | 60%-75% |
| Heavy Load | 75%-95% |
| Very Heavy Load | 95%-100% |

Heat exchanger fouling or fouling of the secondary heat exchanger 120 is modeled as a function of the flow impedance (ZC) at the cold-side that increases and in turn reduces the air flow. Equivalently, this lowers the overall heat transfer coefficient and thus lowers the heat transfer and reduces the efficiency of both heat exchanges 110, 120. In this embodiment, four fouling classes have been defined based on the flow through the cold-side of the secondary heat exchanger as follows: i) Green Class (c0)—the safe region where fouling effect is negligible; ii) Yellow Class (c1)—the region where the influence of fouling is observable and near-time maintenance has to be scheduled; iii) Orange Class (c2)—the region where immediate action has to be taken; and iv) Red Class (c3)—the region where the operation of the air management system 100 must be immediately shut down for safety. The simulation model is run for different values of flow impedance, a resulting flow through the second heat exchanger 120 is observed, and a range of impedance values are determine for each of the above classes defined based on the flow. Table 3 shows the impedance intervals associated with each class, which are open from the right. Each class may further be partitioned into eight uniformly spaced flow values for data generation.

TABLE 3

DEFINITION OF FOULING CASES

| Class | Flow | ZC (kPa · s²/kg²) |
| --- | --- | --- |
| Green (c0) | 80%-100% | 0.00-3.62e−01 |
| Yellow (c1) | 60%-80% | 3.62e−01-1.09e+00 |
| Orange (c2) | 40%-60% | 1.09e+00-3.62e+00 |
| Red (c3) | 0%-40% | 3.62e+00-1.21e+04 |

As noted above, the sensor data depends on the parameters, along with various fouling conditions. Thus, for each day type, time series data are generated for various combinations of the above parameters (e.g., combinations of OCC and TA) to represent each fouling class.

In one operational example, the simulation model was run for different combinations of values of ambient temperature (8) (within each day type), occupant counts (4), and impedance values (8) (within each fouling class), resulting in a set consisting of a total number of 8×4×8=256 runs of time series data. Furthermore, for each day type, similar data sets are generated for all the fouling classes, thus leading to a total of 4×256=1024 runs of time series data. Subsequently, the above data sets are generated for all five day types. Let $\Gamma=\{\gamma_1, \ldots \gamma_{1024}\}$ denote the set of parametric combinations and let $t \in T=\{1, \ldots L=600\}$ denote the set of discrete time indices.

Then, for each day type, the entire data for each sensor $s_i \in S$ is arranged in a $|\Gamma| \times L$ matrix $Zs_i$, where $Zs_i(\gamma, t)$ denotes the sensor reading at time t for parametric combination $\gamma$. Thus, for any given $s=s_i$ and $\gamma=\gamma_j$, $Z_{si}$ is a vector $z_i(\gamma j, \bullet) = [z_i(\gamma_j, 1), z_i(\gamma_j, 2), \ldots zi(\gamma_j, L)]$, which is the time series data for sensor $s_i$ for input condition $\gamma_j \in \Gamma$. For the purpose of this operational example, the variations in OCC and the variations of impedance values within each class are considered as uncertainties. There are several other sources of uncertainties associated with the air management system 100 such as measurement noise, mechanical vibrations, and fluctuations in valve positions, which have been considered by adding 25 dB white Gaussian noise to the data. Note that variations in ambient pressure may also be considered.

Next, at block 310, sensor data is labeled with fouling class information and is used for optimal sensor selection for each day type. That is, since a large number and variety of sensors are available in the air management system 100 at different locations, the underlying processes of data generation, storage, and analysis become cumbersome. Therefore, an optimal sensor selection methodology is utilized to rank the most relevant sensors in terms of the best classification performance for heat exchanger fouling diagnosis.

For example, given the sensor set $S=\{s_1, \ldots s_N\}$, with N sensors, and the class set $C=\{c_1 \ldots c_M\}$, with M classes, the optimal sensor selection is to select a set $U^\star \subseteq S$, where $|U^\star|=n$, n<N, that consists of sensors with maximum classification accuracy and are ranked accordingly in decreasing order.

Two commonly used sensor selection methods are: i) the wrapper method and ii) the filter method. Since the wrapper algorithms rank the sensors based on their correct classification rate (CCR), a feature extractor and a classifier have to be designed, trained, and applied to all sensors to compute their CCRs, thus making the whole process computationally expensive. Furthermore, the wrapper algorithms cannot be generalized to any classifier. On the other hand, the filter algorithms evaluate the performance of each sensor based on an optimization of a cost function (e.g., information theoretic measure cost function). An example of filter algorithms is the minimum Redundancy Maximum Relevance (mRMR) criteria. The mRMR criterion evaluates and ranks the sensors that best describe the classes and simultaneously avoid sensors that provide redundant information by means of the following two conditions: i) maximum relevance and ii) minimum redundancy. The maximum relevance is a criterion that aims to find a value that has the maximum average mutual information between its sensors and the random variable. The minimum redundancy is a criterion that aims to find a value that has the minimum average mutual information between its sensor pairs. In addition, note that a filter operation of the embedded algorithm facilitates fast execution of the first round of data reduction and produces a candidate list of top ranked sensors. Filter algorithms are computationally less expensive and do not depend on the choice of a classifier, but they may not perform as good as the wrapper algorithms.

Embedded sensor selection algorithms (i.e., embedded wrapper and filter algorithms) circumvent these difficulties by taking advantage of both wrapper and the filter algorithms by using a filter to select a candidate list of sensors and then applying a wrapper on this list to rank and select the optimal set of sensors. In this way, the embedded wrapper and filter algorithm is used to tradeoff between the low complexity of filter algorithms and the accuracy of wrapper algorithms in the optimal sensor set selection procedure. Thus, these embedded algorithms are less expensive than wrappers, more accurate than filters, and pertinent to the specified classifier. In one example operation, the embedded wrapper and filter algorithm uses a filter algorithm first to select a candidate list (CL) of n sensors; subsequently, a wrapper algorithm (which uses a specific classifier) is deployed to select or rank the optimal set of sensors from the candidate list.

This invention introduces another optimal sensor selection methodology based on an embodiment of an embedded algorithm utilized by the diagnosis system that may be referred to as an unsupervised embedded algorithm. This unsupervised embedded algorithm also has the advantage that it does not depend on the choice of a classifier and enables faster execution with very low computational complexity.

The unsupervised embedded algorithm relies on a filter algorithm (e.g., the mRMR) to select the candidate list (CL) of n sensors. Then, the data $Zs_i$ corresponding to each sensor $s_i \in CL$, which consists of the data of all classes, are clustered into M clusters using a K-means clustering algorithm, where M is equal to the number of fouling classes. If these clusters are defined as $\{O_1, \ldots O_M\}$ and if a random variable $\Xi_j$ that is drawn on the cluster Oj and whose outcome belongs to the set of classes $C=\{c_1, \ldots c_M\}$, then subsequently, the entropy $H(\Xi_j)$, j=1, . . . M, of the class distribution within each cluster is computed using equation 1. Then, the weighted entropy for all clusters for a sensor $s_i$ is calculated as equation 2.

$$H(X) = -\sum_{i=1}^{r} p^i \ln p^i \tag{1}$$

$$H_{s_i} = \sum_{j=1}^{M} \frac{|O_j|}{\sum_{j=1}^{M} |O_j|} \cdot H(\Xi_j), \forall s_i \in CL \tag{2}$$

In view of the above, the sensors are ranked according to the decreasing order of their entropies such that the sensor that has the lowest entropy is ranked the highest and so on. In this fashion the candidate list CL is re-ranked and a possible list of top ranked sensors (e.g., optimal sensors) is selected for further analysis. This process ranks the sensors in the order such that the sensors that have the least uncertainty between classes in their data clusters are ranked the highest, thus facilitating a better classification decision.

Once an optimal sensor set is obtained, different machine learning methods are applied for analysis of sensor data for fouling diagnosis. These methods consists of the feature extraction, at block 315, and the classification operations, at block 320.

That is, at block 315, the diagnosis system next performs a feature extraction from each optimal sensor. Feature extractions from sensor data of the optimal sensors for heat exchanger fouling diagnosis may be performed by a principal component analysis (PCA) and/or a Gaussian mixture model (GMM). PCA is a data reduction method, where a data matrix X of dimension d×m (d>m>0, whose columns are data vectors (e.g., sensor data)) is transformed into a matrix Y of size d×m', where m'<m. The columns of Y hold the Score Vectors (also known as the principal components). GMM, when considering sensor data $z_i(\gamma, \bullet)=[z_i(\gamma, 1), \ldots z_i(\gamma, L)]$, is a statistical model of $z_i(\gamma, \bullet)$ represented as a sum of R different Gaussian distributions.

Next, once the features are obtained as the principal components or the parameter set of the GMM, the process proceed to block 320 where the diagnosis system performs classifier training by utilizing the features to output trained classifiers. For instance, the diagnosis system can process the features by classifiers to make a decision on the heat exchanger fouling severity. The diagnosis can use a k-Nearest Neighbor (k-NN) algorithm as a classification technique.

In one example operation, the k-NN classifier is applied by the diagnosis system on a feature space generated by PCA and GMM for each sensor in a candidate list CL and each day type. For each observation sequence $z_i(\gamma, \bullet)$, the PCA based features (i.e., principal components) are d=30 dimensional vectors in m'=2 dimensional feature space while the GMM based features (i.e. the parameter set of GMM) are 6 dimensional feature space for each time series data. Since the PCA based features are vectors, the k-NN classifier produces d decisions one for each point in the vector. Then, a single decision is obtained from these decisions using the simple majority rule. In addition, sensor fusion can be performed to enhance the classification performance of block 320.

Figure 4:
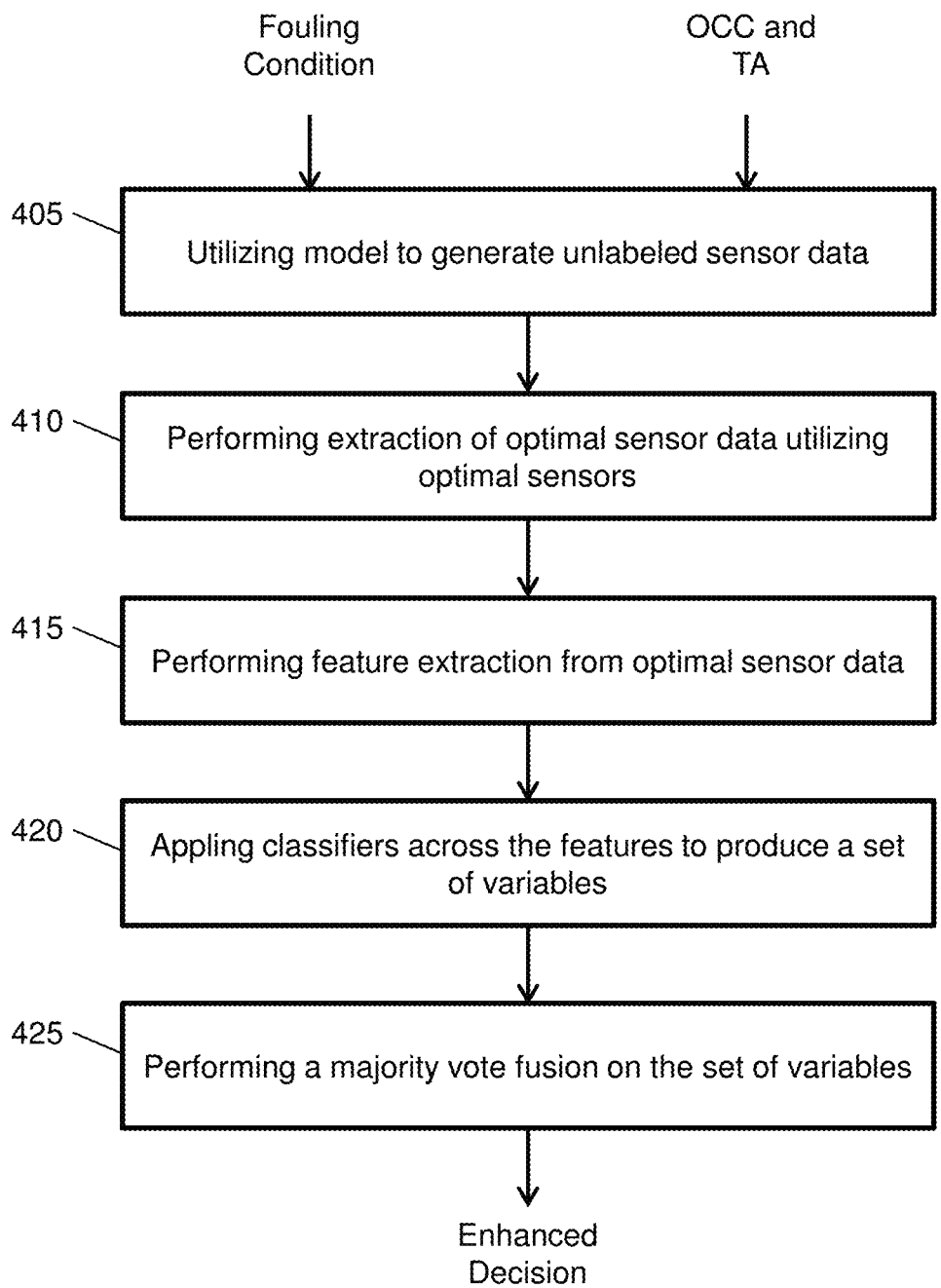
FIG. 4 illustrates a testing phase process flow of a diagnosis system in accordance with an embodiment.

Turning now to FIG. 4, the testing phase of the diagnosis system will now be described with respect to process flow 400. In general, process flow 400 begins, at block 405, with the diagnosis system utilizing the simulation model to generate unlabeled sensor data for a fouling condition and combinations of OCC and TA. Then, at block 410, the diagnosis system performs an extraction of optimal sensor data utilizing the optimal sensors (e.g., determined from block 310 of FIG. 3)

Next, at block 415, the diagnosis system performs a feature extraction from the optimal sensor data. In turn, the trained classifiers produced from the process flow 300 of FIG. 3 are applied across the extracted features to produce a set of classifier decisions based on individual analysis of each optimal sensor at block 420.

In block 425, the diagnosis system performs a majority vote fusion on the set of variables to output an enhanced decision. In this way, the enhanced decision may identify whether the second heat exchanger is experiencing a fouling condition.

Figure 5:
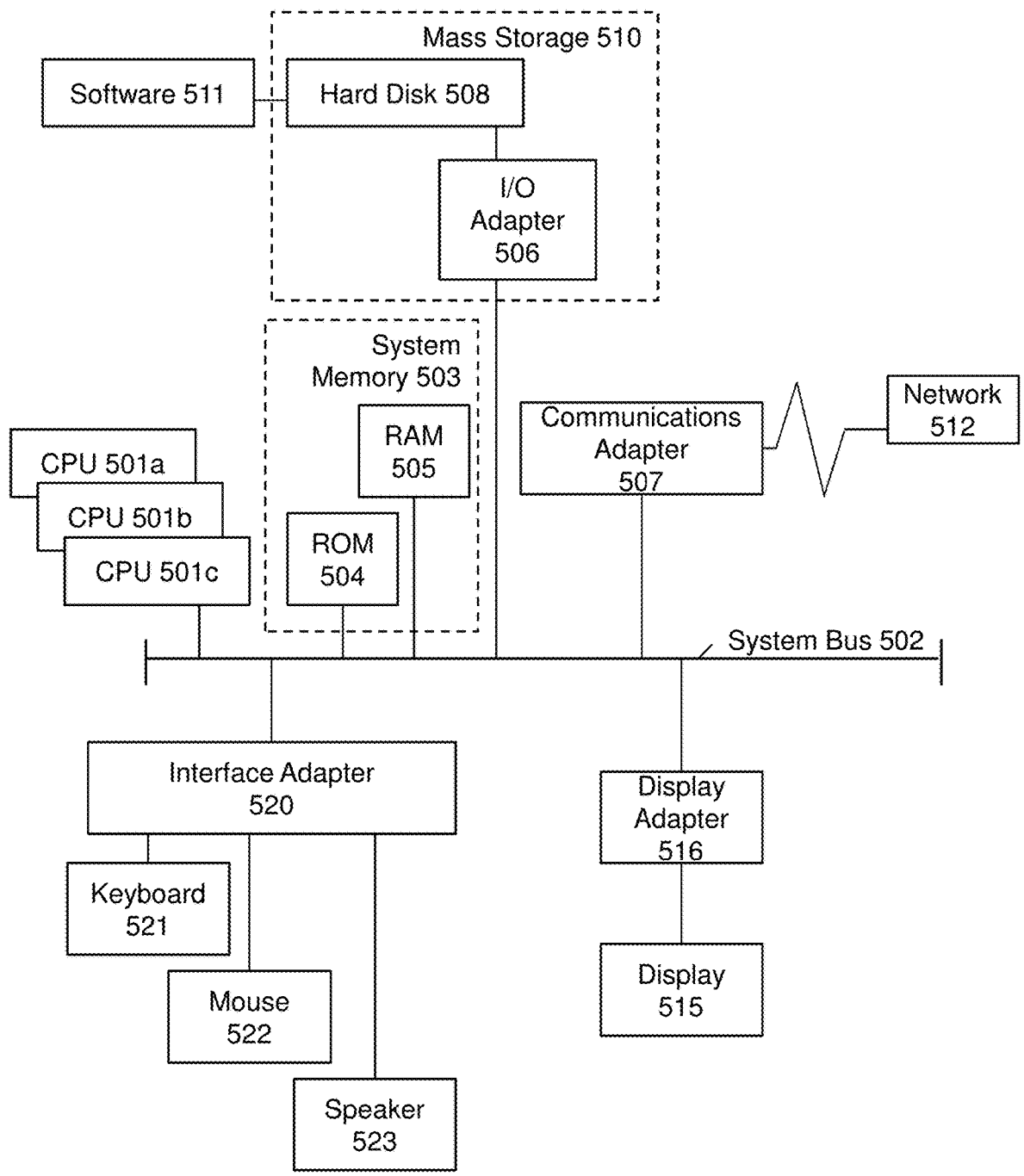
FIG. 5 illustrates a processing system configured to execute process flows of the diagnosis system in accordance with an embodiment.

Referring now to FIG. 5, there is shown an embodiment of a processing system 500 for implementing the diagnosis system. In this embodiment, the processing system 500 has one or more central processing units (processors) 501a, 501b, 501c, etc. (collectively or generically referred to as processor(s) 501). The processors 501, also referred to as processing circuits, are coupled via a system bus 502 to system memory 503 and various other components. The system memory 503 can include read only memory (ROM) 504 and random access memory (RAM) 505. The ROM 504 is coupled to system bus 502 and may include a basic input/output system (BIOS), which controls certain basic functions of the processing system 500. RAM is read-write memory coupled to system bus 502 for use by processors 501.

In addition to the above, the processing system 500 may include an input/output (I/O) adapter 506 and a network adapter 507 coupled to the system bus 502. I/O adapter 506 may be a small computer system interface (SCSI) adapter that communicates with a hard disk 508 or any other similar component. I/O adapter 506 and hard disk 508 may be collectively referred to herein as mass storage 510. Software 511 for execution on processing system 500 may be stored in mass storage 510. The mass storage 510 is an example of a tangible storage medium readable by the processors 501, where the software 511 is stored as instructions for execution by the processors 501 to perform a method, such as the process flows 200, 300, 400 of FIGS. 2-4. Network adapter 507 may interconnect system bus 502 with an outside network 512 and enable processing system 500 to communicate with other such systems. A screen (e.g., a display monitor) 515 may be connected to system bus 502 by display adapter 516, which may include a graphics controller to improve the performance of graphics intensive applications and a video controller. In one embodiment, adapters 506, 507, and 516 may be connected to one or more I/O buses that are connected to system bus 502 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 502 via an interface adapter 520 and the display adapter 516. A keyboard 521, mouse 522, and speaker 523 can be interconnected to system bus 502 via interface adapter 520, which may include, for example, a Super I/O chip integrating multiple device adapters into a single integrated circuit.

Thus, as configured in FIG. 5, the processing system 500 includes processing capability in the form of processors 501, storage capability in the form of at least the system memory 503, input capability in the form of at least the keyboard 521, and output capability in the form of at least the display 515. In one embodiment, a portion of system memory 503 and mass storage 510 collectively store an operating system to coordinate the functions of the various components shown in FIG. 5. Note that in an embodiment, the processing system 500 may be implemented as part of air management system 100, whether local to a testing environment or onboard an aircraft, in communication with the air management system 100. In another embodiments, the processing system 500 may be either external or internal to the air management system 100 as long as the processing system 500 is communicatively coupled to the sensors A-H of the air management system 100, such that outputs from the sensors A-H are received and processed as inputs by the processing system 500.

In view of the above, the technical effects and benefits of embodiments herein include employing a novel algorithm for selection of the optimal sensor set from a suite of a large number of sensors mounted on the air management system of aircraft. The selected sensors are optimal in the sense that they contain the most critical information for fouling diagnosis of the heat exchanger. The air management system is a complex networked system that contains many interconnected components and heterogeneous sensors, thus fault diagnosis becomes a challenging task because of high dimensionality. Given the complexity of the air management system, optimal sensor selection not only reduces the dimensionality of the data by selecting sensors that provide non-redundant and most critical information, but also enhancing the decision of the classifier by opting out the irrelevant sensors. Note that because sensor selection based on engineering common sense is not possible because of component-to-component interconnections and feedback controls, embodiments described herein is beyond current methodologies.

The technical effects and benefits of embodiments herein also include a real-time data-driven built-in-test (BIT) or a classifier that can perform fouling diagnosis in presence of various uncertainties in the air management system and also different operating conditions, such as ambient temperature and occupant count. For example, an aircraft operates in a very noisy environment and sensor measurements are highly sensitive to different flight conditions, such as ambient temperature and heat load. Thus, these flight conditions considerably affect the sensor readings and the BIT decision in turn. By embracing all these sources of uncertainties in the analysis of the simulated data, and training multiple classifiers (one for each day type), embodiments illustrate that the trained classifiers perform robustly and deliver high correct classification rate and low false alarms. Further, the BIT allows for real-time implementation and onboard processing.

The technical effects and benefits of embodiments herein also include performing an information fusion of the optimal sensors to improve the performance of the overall classifier. Information fusion is a critical step to allow for condition based maintenance (CBM). Note the current methodologies suffer from high false alarm rates, which results in unnecessary expensive and time consuming inspection and maintenance. In contrast, by extracting information from optimal heterogeneous sensors, technical effects and benefits of embodiments herein achieves a more accurate decision and allows for early detection of fouling because different sensors react to fouling differently.

The technical effects and benefits of embodiments herein also include increase in financial savings provided to any company from the above benefits, along with an increase in the passengers comfort due to uninterrupted airlines service.

The present invention may be a system, a method, and/or a computer program product. The computer program product may include a computer readable storage medium (or media) having computer readable program instructions thereon for causing a processor to carry out aspects of embodiments herein. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of embodiments herein has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product that comprises a computer readable storage medium having program instructions for determining whether a heat exchanger is fouling embodied therewith, the program instructions executable by a processor to cause the processor to perform:
   a) training classifiers indicative of a plurality of fouling conditions associated with the heat exchanger, the heat exchanger being within a complex networked system; and
   b) testing the classifiers with optimal sensor data from optimal sensors to determine whether the fouling is being experienced by the heat exchanger, wherein, with respect to the training of the classifiers, the program instructions executable by the processor cause the processor to perform:
   performing an extraction of features from each optimal sensor;
   processing the features by the classifiers to determine a fouling severity for each of the plurality of fouling conditions.

2. The computer program product of claim 1, wherein the program instructions executable by the processor to cause the processor to perform:
   performing a selection of the optimal sensors from a plurality of sensors, each of the plurality of sensors being associated with at least one component within the complex networked system, the at least one component including the heat exchanger.

3. The computer program product of claim 2, wherein the selection of the optimal sensors is executed by an unsupervised embedded algorithm.

4. The computer program product of claim 1, wherein with respect to the training of the classifiers the program instructions executable by the processor to cause the processor to perform:
   utilizing a model to generate sensor data based on the plurality of fouling conditions and parametric combinations of ambient temperature and occupancy count, wherein the ambient temperature is a temperature external to and affects the operation of the complex networked system.

5. The computer program product of claim 1, wherein the program instructions executable by the processor to cause the processor to perform:
   outputting an enhanced decision with respect to the testing of the classifiers to determine whether the fouling is being experienced by the heat exchanger.

6. The computer program product of claim 1, wherein the complex networked system is an air management system of an aircraft.

* * * * *